Jan. 3, 1939.  E. E. ALEXANDER  2,142,771

BENDABLE PANEL

Filed Dec. 14, 1937

Inventor
Elmo E. Alexander,
By Minturn Fulwinty,
Attorneys

Patented Jan. 3, 1939

2,142,771

UNITED STATES PATENT OFFICE 2,142,771

BENDABLE PANEL

Elmo E. Alexander, New Albany, Ind.

Application December 14, 1937, Serial No. 179,741

5 Claims. (Cl. 20—92)

This invention relates to the art of forming bends in veneer panels and has for its primary object the formation of a panel that will permit bending thereof in an area or zone of at least 90 degrees in such manner that the veneer or ply wood surface may be carried around and supported without afterwards showing bending lines or checking.

A still further important object of the invention is to provide a panel structure for bending with an insert for backing up the surface ply around the bend without adding any appreciable amount to the cost of forming the panel.

Figure 1:
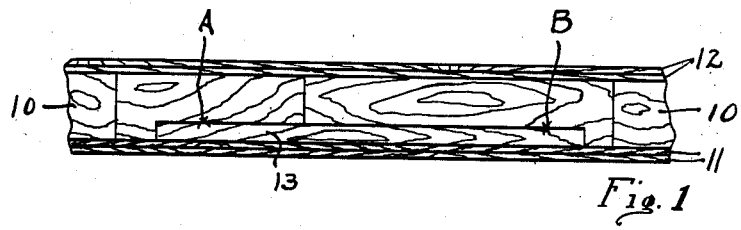
Figure 2:
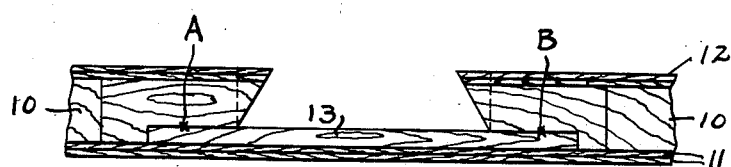
Figure 3:
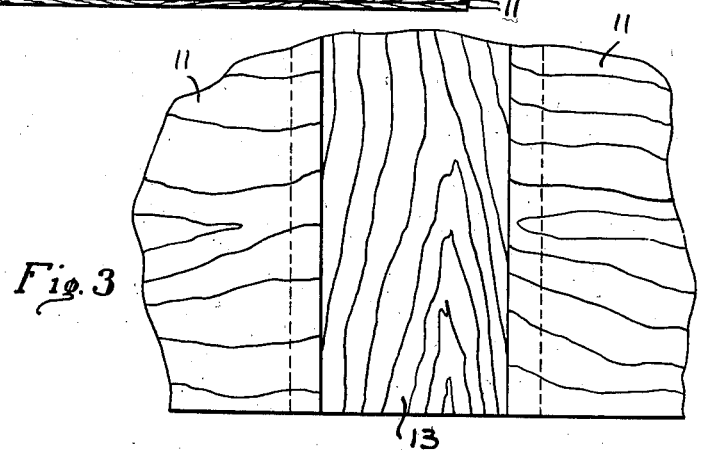
Figures 4, 5:
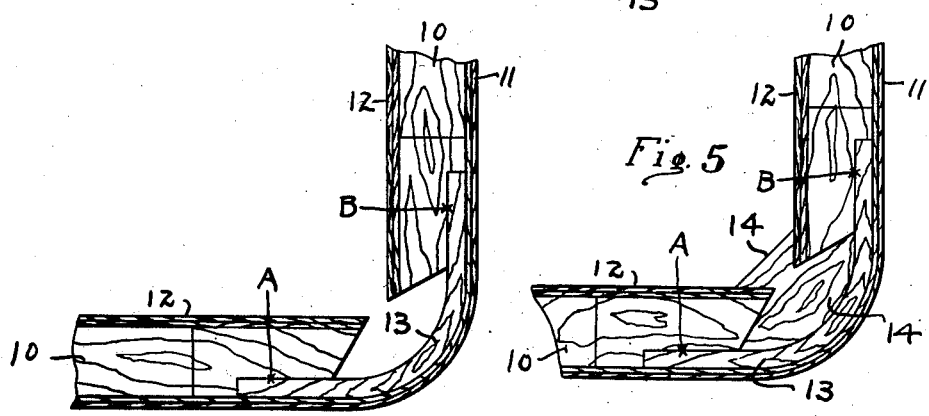

These and many other objects and advantages of the invention will become apparent to those versed in the art in the following description of one particular form of the invention as illustrated more or less diagrammatically in the accompanying drawing, in which Fig. 1 is an edge view of a fragment of a panel embodying the invention;

Fig. 2 a similar view with a panel cut preliminary to the bending operation;

Fig. 3 a rear elevation of the panel fragment as shown in Fig. 2;

Fig. 4 an edge view of the panel of Fig. 2 shown bent 90 degrees; and

Fig. 5 an edge view of the finished panel bend.

Like characters of reference indicate like parts throughout the several views in the drawing.

Referring to the drawing, a panel is built up in the usual manner to have the central core 10 formed of wood, generally in miscellaneous lengths in order to use up scrap, and having that core covered with one or more plies 11 of veneer, the outer ply being the desired wood for finishing. In the form herein shown, there are two such plies 11 indicated. The back or inner side of the core 10 is likewise preferably covered, although not necessarily so, with one or more plies 12 of veneer. As a general practice, the inner ply of veneer is turned to have its grain angularly disposed with the grain of the outer ply, although this particular detail of placement does not constitute the invention.

Prior, however, to the placing of the outer or finish plies 11, the core 10 is cut away over an area and somewhat beyond which will be within the area or zone of the bend to be formed. Preferably this cut away portion is shaped to permit laying therein with a snug fit of a strip of bendable material 13 having parallel edges. This strip 13 may be made out of any suitable material such as metal, rubber, or wood, wood being easily available in the usual panel making shop. In the case of wood, the grain is turned to be parallel or substantially so with the cylindrical elements or axis of the bend. In other words, in Fig. 2, the grain of wood 13 would be perpendicular to the sheet.

The front or outer face of the insert 13 is intimately glued over its entire area to the inner ply 11. However the major portion of the back face of the element 13 is left unglued, the glue being run in from each end to terminate at some such lines as A and B, the area therebetween being left free of glue so that there is no bond in that area between the insert 13 and the core 10.

The core 10 is cut away from the back side either in an undercut fashion as indicated in Fig. 2 or the parallel opposing faces as indicated by the dash lines. The undercut formation has an advantage in that an interlocking feature is presented thereby as will be later described. With the back side of the panel cut as indicated in Figs. 2 and 3, the panel may then be bent around to the desired degree as indicated in Fig. 4 to have the bend come on that part of the insert 13 and the outer plies 11 as lie between the terminal ends of the core therebehind. By reason of the fact that there is no direct bonding of the ends of the insert 13 with the core portions 10 between the points A and B, the insert 13 may accommodate itself very readily to the bend and the material may give over the ends of the core 10 without defining sharp bending lines thereover.

After the bend has been formed as indicated in Fig. 4, a stick 14 having a suitable curvature on its outer face and re-entering portions forming grooves on its sides may be inserted from the top edge of the bent panel and driven downwardly to have its glued sides and front face brought into intimate contact with the undercut ends of the core 10 and the inner side of the insert 13 with a portion of the stick overlying the rear or inner sides of the inner plies 12 adjacent the ends of the core 10.

While I have herein shown and described my invention in the one best form as now known to me, it is obvious that structural variations may be employed without departing from the spirit of the invention and I therefore do not desire to be limited to that precise form beyond the limitations as may be imposed by the following claims.

I claim:

1. A bendable plywood panel comprising a rigid core, at least one ply of veneer over the core, and an insert in the core in juxtaposition with said veneer of an area of bendable material, said core being cut away from the rear side of said insert to leave ends of the core overlapping on the rear side of the insert, the insert being glued to the veneer but not to the outer major portions of the overlapping ends of the core.

2. A bendable plywood panel, comprising a rigid core, at least one ply of veneer over the core, an insert in the core in juxtaposition with said veneer of an area of bendable material, said core being cut away from the rear side of said insert to leave ends of the core overlapping on the rear side of the insert, the insert being glued to the veneer but not to the outer major portions of the overlapping ends of the core, said insert material comprising wood having its grain presented substantially perpendicularly to the cylindrical elements of the bend.

3. A bendable plywood panel comprising a rigid core, at least one ply of veneer over the core, and an insert in the core in juxtaposition with said veneer of an area of bendable material, said core being cut away from the rear side of said insert to leave ends of the core overlapping on the rear side of the insert, said insert material being bonded to said veneer and bonded to said core overlapping ends to leave unbonded areas adjacent those ends to facilitate bending the panel being bent to curve the insert between the cutaway core ends, and a stick correspondingly curved in its outer face and having grooves on its sides, glued to the bent insert and the core-ends.

4. A plywood bend comprising a preformed flat panel having a rigid core, an insert of bendable material in front of the core, a veneer of the plywood panel bonded to the core and to the front of the insert material, and said panel having a section of the core removed from back of the insert, the panel being bent to curve said insert between the cutaway core ends, the distance between said cutaway core ends equaling the length of the arc of the bend and a stick correspondingly curved on its outer face and having grooves on its sides glued to the insert and core-ends.

5. A bendable plywood panel comprising a rigid core, at least one ply of veneer over the core, and an insert in the core in juxtaposition with said veneer of an area of bendable material, said core being cut away from the rear side of said insert to leave ends of the core overlapping on the rear side of the insert, the insert being glued to the veneer but not to the outer major portions of the overlapping ends of the core, the distance between the core ends being equal to the length of bend desired.

ELMO E. ALEXANDER.